(12) United States Patent
Menard-Szczebara et al.

(10) Patent No.: US 12,521,329 B2
(45) Date of Patent: Jan. 13, 2026

(54) ANTIMICROBIAL MIXTURE CONTAINING 4-(3-ETHOXY-4-HYDROXYPHENYL) BUTAN-2-ONE, AND COSMETIC COMPOSITION CONTAINING SAME

(71) Applicant: L'OREAL, Paris (FR)

(72) Inventors: Florence Menard-Szczebara, Chevilly Larue (FR); Sylvie Cupferman, Chevilly Larue (FR); Gael Malet, Chevilly Larue (FR); Julien Galvan, Chevilly Larue (FR)

(73) Assignee: L'OREAL, Paris (FR)

( * ) Notice: Subject to any disclaimer, the term of this patent is extended or adjusted under 35 U.S.C. 154(b) by 237 days.

(21) Appl. No.: 16/626,089

(22) PCT Filed: Jun. 27, 2018

(86) PCT No.: PCT/EP2018/067302
§ 371 (c)(1),
(2) Date: Dec. 23, 2019

(87) PCT Pub. No.: WO2019/002394
PCT Pub. Date: Jan. 3, 2019

(65) Prior Publication Data
US 2020/0253846 A1    Aug. 13, 2020

(30) Foreign Application Priority Data

Jun. 30, 2017  (FR) ...................................... 1756182
Aug. 18, 2017  (FR) ...................................... 1757747
Aug. 18, 2017  (FR) ...................................... 1757748
Aug. 18, 2017  (FR) ...................................... 1757749
Sep. 13, 2017  (FR) ...................................... 1758493

(51) Int. Cl.
| | | |
|---|---|---|
| A61K 8/35 | (2006.01) |
| A01N 35/02 | (2006.01) |
| A01N 37/52 | (2006.01) |
| A01N 43/40 | (2006.01) |
| A01N 43/50 | (2006.01) |
| A01N 59/16 | (2006.01) |
| A61K 8/40 | (2006.01) |
| A61K 8/49 | (2006.01) |
| A61Q 1/00 | (2006.01) |
| A61Q 17/04 | (2006.01) |
| A61Q 19/10 | (2006.01) |

(52) U.S. Cl.
CPC ................ *A61K 8/35* (2013.01); *A01N 35/02* (2013.01); *A01N 37/52* (2013.01); *A01N 43/40* (2013.01); *A01N 43/50* (2013.01); *A01N 59/16* (2013.01); *A61K 8/40* (2013.01); *A61K 8/4926* (2013.01); *A61K 8/4946* (2013.01); *A61Q 1/00* (2013.01); *A61Q 17/04* (2013.01); *A61Q 19/10* (2013.01)

(58) Field of Classification Search
CPC ....................................................... A61K 8/35
See application file for complete search history.

(56) References Cited

U.S. PATENT DOCUMENTS

| | | | | |
|---|---|---|---|---|
| 5,854,266 A | * | 12/1998 | Nelson, Jr. ........... | A61Q 17/005 514/345 |
| 2009/0047851 A1 | * | 2/2009 | Nelson ................... | A01N 43/40 424/618 |
| 2009/0306154 A1 | | 12/2009 | Pillai et al. | |
| 2010/0119461 A1 | | 5/2010 | Bicard-Benhamou et al. | |
| 2017/0208815 A1 | * | 7/2017 | Sharma ................. | A01N 43/40 |

FOREIGN PATENT DOCUMENTS

| | | | |
|---|---|---|---|
| CN | 1168653 | * | 12/1997 |
| WO | WO 2011/039445 A1 | | 4/2011 |
| WO | WO2012130953 | * | 2/2014 |

* cited by examiner

*Primary Examiner* — Sarah Alawadi
(74) *Attorney, Agent, or Firm* — POLSINELLI PC

(57) ABSTRACT

The invention relates to an antimicrobial mixture containing 4-(3-ethoxy-4-hydroxyphenyl)butan-2-one and an additional compound chosen from a monovalent or divalent metal salt of pyrithione, piroctone olamine, diazolidinylurea, a hexamidine compound, and imidazolidinylurea,
and also to a cosmetic composition containing such a mixture.
Application to caring for, making up and cleansing keratin materials.

27 Claims, No Drawings

ANTIMICROBIAL MIXTURE CONTAINING 4-(3-ETHOXY-4-HYDROXYPHENYL) BUTAN-2-ONE, AND COSMETIC COMPOSITION CONTAINING SAME

CROSS REFERENCE TO RELATED APPLICATIONS

This application is a National Phase filing under 35 U.S.C. § 371 of PCT/EP2018/067302 filed on 27 Jun. 2018; which application in turn claims priority to Application No. 1756182 filed in France on 30 Jun. 2017; Application No. 1757747 filed in France on 18 Aug. 2017; Application No. 1757748 filed in France on 18 Aug. 2017; Application No. 1757749 filed in France on 18 Aug. 2017; and Application No. 1758493 filed in France on 13 Sep. 2017. The entire contents of each application are hereby incorporated by reference.

A subject of the present invention is an antimicrobial mixture containing 4-(3-ethoxy-4-hydroxyphenyl)butan-2-one and a particular additional compound, and also a cosmetic composition containing such a mixture.

4-(3-Ethoxy-4-hydroxyphenyl)butan-2-one (ketone compound) is a useful substance as a preserving agent for cosmetic compositions, for protecting the compositions against microbial contamination, as described in patent application WO 2011/039445.

However, it is desirable to be able to incorporate said ketone compound in reduced concentration in compositions, especially cosmetic or dermatological compositions, while at the same time maintaining good antimicrobial preservation performance. Combinations of the ketone compound with other compounds that have antimicrobial efficacy are thus sought for this purpose.

The inventors have discovered, unexpectedly, that the combination of 4-(3-ethoxy-4-hydroxyphenyl)butan-2-one with an additional compound chosen from a monovalent or divalent metal salt of pyrithione, piroctone olamine, diazolidinylurea, a hexamidine compound and imidazolidinylurea makes it possible to obtain an antimicrobial mixture with synergistic antimicrobial activity, in particular on at least on yeasts, in particular on *Candida albicans*.

The results of the examples described below show the synergistic antimicrobial activity obtained with the minimum inhibitory concentration (MIC) measurements taken with several mixtures. The antimicrobial activity is considered as being synergistic when the antimicrobial mixture makes it possible to obtain a percentage of strain growth of less than 20%, or even less than 25%.

The combination of 4-(3-ethoxy-4-hydroxyphenyl)butan-2-one with a monovalent or divalent metal salt of pyrithione, in particular said zinc salt, makes it possible to obtain an antimicrobial mixture which has synergistic antimicrobial activity, in particular on gram+ bacteria, especially on *Staphylococcus aureus* and on yeasts, in particular on *Candida albicans*.

The combination of 4-(3-ethoxy-4-hydroxyphenyl)butan-2-one with piroctone olamine makes it possible to obtain an antimicrobial mixture with synergistic antimicrobial activity, in particular on yeasts, in particular on *Candida albicans*.

Application FR-A-2962333 describes a cosmetic composition for the treatment of oily skin comprising a 2-alkoxy-4-alkyl ketone phenol and an essential oil. The composition may comprise an additional active agent for oily skin care, such as antimicrobial agents, among which mention is made of piroctone olamine. This document does not specifically describe an antimicrobial mixture constituted of the combination of 4-(3-ethoxy-4-hydroxyphenyl)butan-2-one with piroctone olamine, nor does it suggest that such a mixture has synergistic antimicrobial activity on yeasts, in particular on *Candida albicans*.

The combination of 4-(3-ethoxy-4-hydroxyphenyl)butan-2-one with diazolidinylurea makes it possible to obtain an antimicrobial mixture with synergistic antimicrobial activity on yeasts, in particular on *Candida albicans*.

The combination of 4-(3-ethoxy-4-hydroxyphenyl)butan-2-one with a hexamidine compound makes it possible to obtain an antimicrobial mixture with synergistic antimicrobial activity on yeasts, in particular on *Candida albicans*.

Application FR-A-2962333 describes a cosmetic composition for the treatment of oily skin comprising a 2-alkoxy-4-alkyl ketone phenol and an essential oil. The composition may comprise an additional active agent for oily skin care, such as antimicrobial agents, among which mention is made of hexamidine isethionate. This document does not specifically describe an antimicrobial mixture constituted of the combination of 4-(3-ethoxy-4-hydroxyphenyl)butan-2-one with hexamidine isethionate, nor does it suggest that such a mixture has synergistic antimicrobial activity on yeasts, in particular on *Candida albicans*.

The combination of 4-(3-ethoxy-4-hydroxyphenyl)butan-2-one with imidazolidinylurea makes it possible to obtain an antimicrobial mixture which has synergistic antimicrobial activity, in particular on molds, in particular on *Aspergillus niger*, and on yeasts, in particular on *Candida albicans*.

More specifically, a subject of the invention is an antimicrobial mixture comprising, or constituted of, 4-(3-ethoxy-4-hydroxyphenyl)butan-2-one and an additional compound chosen from a monovalent or divalent metal salt of pyrithione, piroctone olamine, diazolidinylurea, a hexamidine compound chosen from hexamidine diisethionate, hexamidine diparaben and hexamidine paraben, and imidazolidinylurea.

A subject of the invention is also a composition, especially a cosmetic or dermatological composition, comprising, in a physiologically acceptable medium, said mixture described previously.

A further subject of the invention is a process for the non-therapeutic cosmetic treatment of keratin materials, comprising the application to the keratin materials of a composition as described previously. The process may be a cosmetic process for caring for or making up or cleansing keratin materials.

A subject of the invention is also a process for preserving a composition comprising a physiologically acceptable medium, in particular a cosmetic or dermatological composition, characterized in that it consists in incorporating into said composition an antimicrobial mixture as described previously.

A subject of the invention is also the use of the antimicrobial mixture described previously for preserving a composition comprising a physiologically acceptable medium.

4-(3-Ethoxy-4-hydroxyphenyl) butan-2-one is a compound of formula:

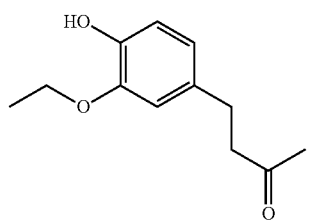

According to a first embodiment, a subject of the invention is an antimicrobial mixture comprising, or constituted (or consisting) of, 4-(3-ethoxy-4-hydroxyphenyl)butan-2-one and a monovalent or divalent metal salt of pyrithione.

Pyrithione is the compound 1-hydroxy-2(1H)-pyridinethione or 2-pyridinethiol-1-oxide.

The pyrithione salts used in the context of the invention are the monovalent metal salts and the divalent metal salts (also referred to as pyrithione salt in the remainder of the description), such as the sodium, calcium, magnesium, barium, strontium, zinc, cadmium, tin and zirconium salts. The preferred salts are the sodium or zinc salts, and preferentially the zinc salt (zinc pyrithione).

Zinc pyrithione corresponds to the compound of chemical formula above (CAS No.: 13463-41-7):

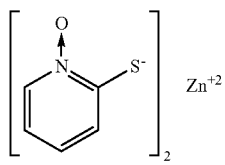

Advantageously, the 4-(3-ethoxy-4-hydroxyphenyl)butan-2-one and the monovalent or divalent metal salt of pyrithione are present in said mixture in a content such that the 4-(3-ethoxy-4-hydroxyphenyl)butan-2-one/pyrithione salt weight ratio ranges from 400 to 4500, and more preferentially ranges from 500 to 4300.

The antimicrobial mixture may have a 4-(3-ethoxy-4-hydroxyphenyl)butan-2-one/pyrithione salt weight ratio ranging from 400 to 2500, preferably ranging from 500 to 2200, preferably ranging from 1000 to 2200 and more preferentially ranging from 1800 to 2200. Such a mixture has good antimicrobial activity on the gram-positive bacterium *Staphylococcus aureus*.

The antimicrobial mixture may have a 4-(3-ethoxy-4-hydroxyphenyl)butan-2-one/pyrithione salt weight ratio ranging from 800 to 4500, preferably ranging from 900 to 4300 and more preferentially ranging from 950 to 4200. Such a mixture has good antimicrobial activity on yeasts, in particular on *Candida albicans*.

According to a second embodiment, a subject of the invention is an antimicrobial mixture comprising, or constituted of, 4-(3-ethoxy-4-hydroxyphenyl)butan-2-one and piroctone olamine.

The piroctone olamine corresponds to the compound of the ethanolamine salt of 1-hydroxy-4-methyl-6-(2,4,4-trimethylpentyl)-2(1H)pyridone (CAS No.: 68890-66-4; INCI name: PIROCTONE OLAMINE) of formula:

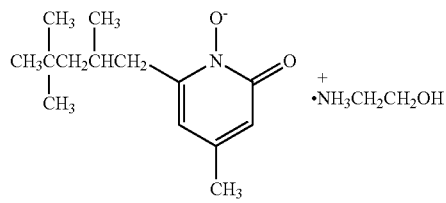

Advantageously, the 4-(3-ethoxy-4-hydroxyphenyl)butan-2-one and the piroctone olamine are present in said mixture in a content such that the 4-(3-ethoxy-4-hydroxyphenyl)butan-2-one/piroctone olamine weight ratio ranges from 10 to 60, preferably ranges from 15 to 50 and preferentially ranges from 18 to 45.

According to a third embodiment, a subject of the invention is an antimicrobial mixture comprising, or constituted of, 4-(3-ethoxy-4-hydroxyphenyl)butan-2-one and diazolidinylurea.

The diazolidinylurea corresponds to the compound 1-[1,3-bis(hydroxymethyl)-2,5-dioxoimidazolidin-4-yl]-1,3-bis(hydroxymethyl)urea (CAS No.: 78491-02-8), corresponding to the formula below:

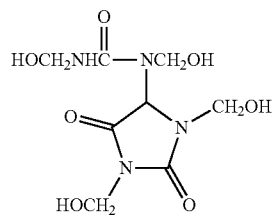

Advantageously, the 4-(3-ethoxy-4-hydroxyphenyl)butan-2-one and the diazolidinylurea are present in said mixture in contents such that the 4-(3-ethoxy-4-hydroxyphenyl)butan-2-one/diazolidinylurea weight ratio ranges from 0.5 to 2.5, preferably ranges from 0.6 to 2.3, preferably ranges from 0.7 to 2 and more preferentially ranges from 0.7 to 1.8 and better still ranges from 1.2 to 1.8.

Such a mixture has good antimicrobial activity on yeasts, in particular on *Candida albicans*.

According to a fourth embodiment, a subject of the invention is an antimicrobial mixture comprising, or constituted of, 4-(3-ethoxy-4-hydroxyphenyl)butan-2-one and a hexamidine compound chosen from hexamidine diisethionate, hexamidine diparaben and hexamidine paraben.

Preferably, the hexamidine compound is hexamidine diisethionate (CAS No.: 659-40-5) which has the chemical formula:

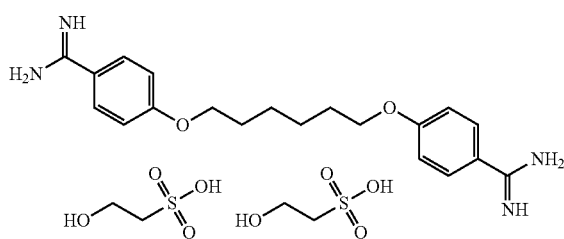 [SMILES: N=C(N)c1ccc(OCCCCCCOc2ccc(C(=N)N)cc2)cc1 ; O=S(=O)(O)CCO ; O=S(=O)(O)CCO]

Advantageously, the 4-(3-ethoxy-4-hydroxyphenyl)butan-2-one and the hexamidine compound previously described are present in said mixture in a content such that the 4-(3-ethoxy-4-hydroxyphenyl)butan-2-one/hexamidine compound weight ratio ranges from 5 to 85, preferably ranges from 7 to 82, and more preferentially ranges from 15 to 60.

Such a mixture has good antimicrobial activity on yeasts, in particular on *Candida albicans*.

According to a fifth embodiment, a subject of the invention is an antimicrobial mixture comprising, or constituted of, 4-(3-ethoxy-4-hydroxyphenyl)butan-2-one and imidazolidinylurea.

The imidazolidinylurea corresponds to the compound 1,1'-methylenebis{3-[4-(hydroxymethyl)-2,5-dioxoimidazolidin-4-yl]urea} (CAS No.: 39236-46-9) which has the formula:

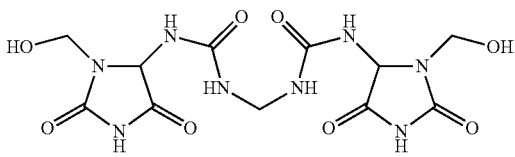 [SMILES: O=C(NCNC(=O)NC1C(=O)NC(=O)N1CO)NC1C(=O)NC(=O)N1CO]

Advantageously, the 4-(3-ethoxy-4-hydroxyphenyl)butan-2-one and the imidazolidinylurea are present in said mixture in a content such that the 4-(3-ethoxy-4-hydroxyphenyl)butan-2-one/imidazolidinylurea weight ratio ranges from 0.1 to 0.8 and preferentially ranges from 0.15 to 0.45.

The antimicrobial mixture may have a 4-(3-ethoxy-4-hydroxyphenyl)butan-2-one/imidazolidinylurea weight ratio ranging from 0.2 to 0.8, and more preferentially ranging from 0.4 to 0.6. Such a mixture has good antimicrobial activity on molds, notably on *Aspergillus niger*.

The antimicrobial mixture may have a 4-(3-ethoxy-4-hydroxyphenyl)butan-2-one/imidazolidinylurea weight ratio ranging from 0.1 to 0.6, and more preferentially ranging from 0.15 to 0.45. Such a mixture has good antimicrobial activity on yeasts, in particular on *Candida albicans*.

A subject of the invention is also a composition comprising, in a physiologically acceptable medium, the antimicrobial mixture described previously.

The term "physiologically acceptable medium" means a medium that is compatible with human keratin materials such as the skin, the scalp, the hair and the nails. Said medium may comprise one or more additional ingredients other than the ketone compound and the additional compound described previously.

The compound 4-(3-ethoxy-4-hydroxyphenyl)butan-2-one may be present in the composition according to the invention in an amount ranging from 0.01% to 5% by weight relative to the total weight of the composition, preferably ranging from 0.01% to 3% by weight, preferentially ranging from 0.01% to 2.5% by weight and more preferentially ranging from 0.01% to 2% by weight.

The composition may comprise at least one additional ingredient chosen from water, oils, polyols containing from 2 to 10 carbon atoms, gelling agents, surfactants, film-forming polymers, colorants, fragrances, fillers, UV-screening agents, plant extracts, cosmetic and dermatological active agents, and salts.

The composition according to the invention may comprise an aqueous phase.

The composition may comprise water, which may be present at a content ranging from 5% to 90% by weight relative to the total weight of the composition, and preferably ranging from 35% to 75% by weight.

The composition may also comprise a polyol that is water-miscible at ambient temperature (25° C.), especially chosen from polyols especially containing from 2 to 10 carbon atoms, preferably containing from 2 to 6 carbon atoms, such as glycerol, propylene glycol, 1,3-propanediol, butylene glycol, pentylene glycol, hexylene glycol, dipropylene glycol, diethylene glycol or diglycerol. Advantageously, the composition according to the invention comprises 1,3-propanediol, in particular in a content ranging from 0.1% to 20% by weight and preferably ranging from 0.1% to 10% by weight, preferentially ranging from 0.5% to 5% by weight, relative to the total weight of the composition.

The compositions according to the invention may be in the form of oil-in-water (O/W) emulsions, water-in-oil (W/O) emulsions or multiple emulsions (triple: W/O/W or O/W/O), oily solutions, oily gels, aqueous solutions, aqueous gels, or solid compositions. These compositions are prepared according to the usual methods.

The compositions according to the invention may be more or less fluid and may have the appearance of a white or colored cream, an ointment, a milk, a lotion, a serum, a paste or a foam. They may be optionally applied to the skin in aerosol form. They may also be in solid form, for example in the form of a stick or a compact powder.

The composition according to the invention may notably be in the form of:
a makeup product, notably for making up the skin of the face, the body, or the lips or the eyelashes;
an aftershave gel or lotion; a shaving product;
a deodorant (stick, roll-on or aerosol);
a hair-removing cream;
a body hygiene composition such as a shower gel or a shampoo;
a pharmaceutical composition;
a solid composition such as a soap or a cleansing bar;
an aerosol composition also comprising a pressurized propellant;
a hair-setting lotion, a hair-styling cream or gel, a dyeing composition, a permanent-waving composition, a lotion or a gel for combating hair loss, or a hair conditioner;
a composition for caring for or cleansing the skin.

A subject of the invention is also a process for preparing a composition, especially a cosmetic or dermatological composition, comprising a step of mixing 4-(3-ethoxy-4-hydroxyphenyl)butan-2-one, the additional compound described previously, and one or more additional ingredients, especially cosmetic or dermatological ingredients, such as those described previously.

The invention is illustrated in greater detail in the example that follows. The amounts of the ingredients are expressed as weight percentages.

EXAMPLE 1: DETERMINATION OF THE SYNERGISTIC ANTIMICROBIAL ACTIVITY AS MIC

The demonstration of a synergistic antimicrobial activity effect with a mixture of 4-(3-ethoxy-4-hydroxyphenyl)butan-2-one (referred to as substance A) and of additional compound (referred to as substance B) is performed by calculating the synergy index (or FIC index) according to the following formula:

FIC Index=(MIC of $A$ with $B$/MIC of $A$)+(MIC of $B$ with $A$/MIC of $B$)

with:
MIC of A with B: minimum concentration of product A in the combination A+B which makes it possible to obtain an inhibitory effect;
MIC of B with A: minimum concentration of product B in the combination A+B which makes it possible to obtain an inhibitory effect;
MIC of A: minimum inhibitory concentration of product A alone;
MIC of B: minimum inhibitory concentration of product B alone.

This formula was described for the first time in the article by F. C. Kull, P. C. Eisman, H. D. Sylwestrowka, and R. L. Mayer, Applied Microbiology 9:538-541, 1961.

For each compound tested alone, the MIC is considered as the first concentration which makes it possible to obtain a microbial growth percentage of less than or equal to 20%, or even less than 25%.

As regards the combinations tested, MIC of A with B and MIC of B with A are the respective concentrations of A and of B in the combinations which make it possible to obtain a microbial growth percentage of less than or equal to 20%, or even less than 25%.

Interpretation of the FIC Index:

When the FIC index value is less than or equal to 1, it is considered that the combination of test compounds has a synergistic effect.

The summary of the results obtained is presented in the following tables.

The combination of compounds A and B was tested on the following strains or a part of these strains: *Candida albicans, Staphylococcus aureus, Aspergillus niger.*

The microbial strain *Staphylococcus aureus* ATCC 6538 and a double-concentration nutrient broth liquid culture medium were used.

The microbial strain *Candida albicans* ATCC 10231 and a double-concentration Sabouraud broth liquid culture medium were used.

The microbial strain *Aspergillus niger* ATCC 6275, and a double-concentration Sabouraud broth liquid culture medium supplemented with polyoxyethylenated (20 EO) sorbitan monopalmitate (Tween 40 from Croda) and Phytagel© BioReagent were used.

A 96-well microplate at an incubation temperature of 32.5° C. is used.

The incubation time of the microplate for the abovementioned two strains is:
- from 18 to 24 h aerobically for *Candida albicans* and *Staphylococcus aureus.*
- from 24 hours to 48 hours aerobically for *Aspergillus niger*

Tests

For each compound:
A=4-(3-ethoxy-4-hydroxyphenyl) butan-2-one compound
B=additional compound.

A 10% (weight/volume) stock solution was prepared by mixing 1 g of compound in 9 ml of aqueous 1‰ agar solution. Successive dilutions were made with the 1‰ agar solution.

Tests of Compounds A and B Alone

50 µl of each of the daughter solutions obtained containing compound A or B are added to the microplate wells. 100 µl of Sabouraud liquid nutrient broth inoculated at double concentration with the *Candida albicans* strain and 50 µl of aqueous 1‰ agar solution are also added thereto.

Tests of Compounds A and B as a Mixture

50 µl of each of the daughter solutions obtained containing compound A and 50 µl of each of the daughter solutions obtained containing compound B are added to the microplate wells. 100 µl of Sabouraud liquid nutrient broth inoculated at double concentration with the *Candida albicans* strain are also added thereto.

Microbial Growth Control

A positive microbial growth control was also prepared. The positive microbial growth control corresponds to the mixture of 100 µl of aqueous 1‰ agar solution with 100 µl of Sabouraud liquid nutrient broth inoculated at double concentration with the *Candida albicans* strain in the absence of compounds A and B.

Absorbance Control for Compounds A and B Alone

An absorbance control was performed in parallel on compounds A and B alone. This control corresponds to 100 µl of double concentration sterile Sabouraud liquid nutrient broth+100 µl of double concentration compound A or B.

In the three cases (absorbance control, growth control and test), the final volume present in each of the microplate wells is 200 µl.

In the two cases (test and control), the inoculum represents the concentration of the *Candida albicans* strain present in the final volume of the wells (200 µl) and is between 2 and $6 \times 10^5$ cfu/ml of *Candida albicans*.

The minimum inhibitory concentration (MIC) of each compound A and B alone and in combination was determined in a known manner by means of optical density measurements at a wavelength of 620 nm.

The test as described above (tests, absorbance control and growth control) was performed again to test the combination A+B on the *Staphylococcus aureus* strain and on the *Aspergillus niger* strain as appropriate.

The followings results were obtained with B1=zinc pyrithione compound (solution at 48% of starting material in water as a mixture with 2% of sodium polynaphthalenesulfonate and 0.28% cellulose gum*).

* It is considered that the additives present at such a low concentration have no influence on the MIC results obtained.

*Staphylococcus aureus*

| Concentrations tested (in weight %) | 0 A | 0.0625 A | 0.125 A | 0.25 A | 0.5 A |
|---|---|---|---|---|---|
| 0 of B1 | | 87 | 77 | 78 | 4 |
| 0.00006 B1 | 34 | 42 | 51 | 40 | 1 |
| 0.00012 B1 | 26 | 11 (FIC 0.625) | 7 (FIC 0.75) | 1 (FIC 1) | 0 |
| 0.00024 B1 | 0 | 0 | 1 | 0 | 0 |

| % MIC of A alone | % MIC of B1 alone | MIC of each compound as a mixture A % | MIC of each compound as a mixture B1 % | FIC Index | Ratio A/B1 |
|---|---|---|---|---|---|
| 0.5 | 0.00024 | 0.0625 | 0.00012 | 0.625 | 520 |

The results obtained show synergistic inhibitory activity for the mixtures:
i) 0.0625% of A and 0.00012% of B1, i.e. A/B1 ratio=520
ii) 0.125% of A and 0.00012% of B1, i.e. A/B1 ratio=1041
iii) 0.25% of A and 0.00012% of B1, i.e. A/B1 ratio=2083

*Candida albicans*

| Concentrations tested (in weight %) | 0 A | 0.025 A | 0.05 A | 0.1 A | 0.2 A |
|---|---|---|---|---|---|
| 0 B1 | | 84 | 71 | 48 | 10 |
| 0.000006 B1 | 80 | 83 | 60 | 47 | 14 |
| 0.000012 B1 | 42 | 30 | 28 | 25 | 5 |
| 0.000024 B1 | 34 | 15 (FIC 0.625) | 13 (FIC 0.75) | 14 (FIC 1) | 5 |
| 0.000048 B1 | 18 | 9 | 6 | 12 | 4 |

| % MIC of A alone | % MIC of B1 alone | MIC of each compound as a mixture | | FIC Index | Ratio A/B1 |
|---|---|---|---|---|---|
| | | A % | B1 % | | |
| 0.2 | 0.000048 | 0.025 | 0.000024 | 1 | 1041 |

The results obtained show synergistic inhibitory activity for the mixtures:
  i) 0.025% of A and 0.000024% of B1, i.e. A/B1 ratio=1041
  ii) 0.05% of A and 0.000024% of B1, i.e. A/B1 ratio=2083
  iii) 0.1% of A and 0.000024% of B1, i.e. A/B1 ratio=4166

EXAMPLE 2: DETERMINATION OF THE SYNERGISTIC ANTIMICROBIAL ACTIVITY IN MIC ON THE MICROBIAL STRAIN *CANDIDA ALBICANS*

The demonstration of a synergistic antimicrobial activity effect with a mixture of 4-(3-ethoxy-4-hydroxyphenyl)butan-2-one (referred to as substance A) and of piroctone olamine (referred to as substance B2) is performed according to the protocol described in example 1.

The following results were obtained:

*Candida albicans*

| concentrations tested (in weight %) | 0 A | 0.025 A | 0.05 A | 0.1 A |
|---|---|---|---|---|
| 0 B2 | | 52 | 31 | 18 |
| 0.00125 B2 | 35 | 21 | 14 | 7 |
| 0.0025 B2 | 0 | 0 | 1 | 0 |

| % MIC A | MIC B2 | MIC of each compound as a mixture | | FIC Index | Ratio A/B2 |
|---|---|---|---|---|---|
| | | A % | B2 % | | |
| 0.1 | 0.005 | 0.025 | 0.00125 | 0.75 | 20 |

The results obtained show synergistic inhibitory activity for the mixtures:
  i) 0.025% of A and 0.00125% of B2, i.e. A/B2 ratio=20
  ii) 0.05% of A and 0.00125% of B2, i.e. A/B2 ratio=40

EXAMPLE 3: DETERMINATION OF THE SYNERGISTIC ANTIMICROBIAL ACTIVITY AS MIC

The demonstration of a synergistic antimicrobial activity effect with a mixture of 4-(3-ethoxy-4-hydroxyphenyl)butan-2-one (referred to as substance A) and of diazolidinylurea (referred to as substance B3) is performed according to the protocol described in example 1.

The following results were obtained:

*Candida albicans*

| Concentrations tested (in weight %) | 0 A | 0.025 A | 0.05 A | 0.1 A | 0.2 A |
|---|---|---|---|---|---|
| 0 B3 | | 71 | 65 | 44 | 4 |
| 0.0625 B3 | 55 | 26 | 17 | 7 | 1 |
| | | | (FIC 0.75) | (FIC 1) | |
| 0.125 B3 | 10 | 5 | 4 | 1 | 0 |

| % MIC of A alone | % MIC of B3 alone | MIC of each compound as a mixture | | FIC Index | Ratio A/B3 |
|---|---|---|---|---|---|
| | | A % | B3 % | | |
| 0.2 | 0.125 | 0.05 | 0.0625 | 0.75 | 0.8 |

The results obtained show synergistic inhibitory activity for the mixtures:
  i) 0.05% of A and 0.0625% of B3, i.e. A/B3 ratio=0.8
  ii) 0.1% of A and 0.0625% of B3, i.e. A/B3 ratio=1.6.

EXAMPLE 4: DETERMINATION OF THE SYNERGISTIC ANTIMICROBIAL ACTIVITY AS MIC

The demonstration of a synergistic antimicrobial activity effect with a mixture of 4-(3-ethoxy-4-hydroxyphenyl)butan-2-one (referred to as substance A) and of hexamidine diisethionate (referred to as substance B4) is performed according to the protocol described in example 1.

The following results were obtained:

*Candida albicans*

| Concentrations tested (in weight %) | 0 A | 0.025 A | 0.05 A | 0.1 A | 0.2 A |
|---|---|---|---|---|---|
| 0 B4 | | 83 | 71 | 46 | 6 |
| 0.00125 B4 | 78 | 4 | 1 | 0 | 1 |
| | | (FIC 0.375) | (FIC 0.5) | (FIC 0.75) | |
| 0.0025 B4 | 59 | 0 | 0 | 0 | 0 |
| | | (FIC 0.675) | (FIC 0.75) | (FIC 1) | |
| 0.005 B4 | 3 | 0 | 0 | 0 | 0 |

| % MIC of A alone | % MIC of B4 alone | MIC of each compound as a mixture | | FIC Index | Ratio A/B4 |
|---|---|---|---|---|---|
| | | A % | B4 % | | |
| 0.2 | 0.005 | 0.025 | 0.00125 | 0.375 | 20 |

The results obtained show synergistic inhibitory activity for the mixtures:
  i) 0.025% of A and 0.00125% of B4, i.e. A/B4 ratio=20
  ii) 0.05% of A and 0.00125% of B4, i.e. A/B4 ratio=40
  iii) 0.1% of A and 0.00125% of B4, i.e. A/B4 ratio=80 iv) 0.025% of A and 0.0025% of B4, i.e. A/B4 ratio=10
v) 0.05% of A and 0.0025% of B4, i.e. ratio A/B4=20
vi) 0.1% of A and 0.0025% of B4, i.e. ratio A/B4=40.

EXAMPLE 5: DETERMINATION OF THE SYNERGISTIC ANTIMICROBIAL ACTIVITY AS MIC

The demonstration of a synergistic antimicrobial activity effect with a mixture of 4-(3-ethoxy-4-hydroxyphenyl)butan-2-one (referred to as substance A) and of imidiazolidinylurea (referred to as substance B5) is performed according to the protocol of example 1.

The following results were obtained:

*Aspergillus niger*

| Concentrations tested (in weight %) | 0 A | 0.0625 A | 0.125 A | 0.25 A |
|---|---|---|---|---|
| 0 B5 | | 85 | 43 | 4 |
| 0.0625 B5 | 98 | 94 | 44 | 10 |
| 0.125 B5 | 97 | 92 | 40 | 5 |
| 0.25 B5 | 92 | 68 | 16 (FIC 0.75) | 3 |
| 0.5 B5 | 38 | 24 | 5 (FIC 1) | 1 |
| 1 B5 | 2 | 1 | 1 | 1 |

| % MIC of A alone | % MIC of B5 alone | MIC of each compound as a mixture A % | MIC of each compound as a mixture B5 % | FIC Index | Ratio A/B5 |
|---|---|---|---|---|---|
| 0.25 | 1 | 0.125 | 0.25 | 0.75 | 0.5 |

The results obtained show synergistic inhibitory activity for the mixture:
i) 0.125% of A and 0.25% of B5, i.e. ratio A/B5=0.5
ii) 0.125% of A and 0.5% of B5, i.e. ratio A/B5=0.25

*Candida albicans*

| Concentrations tested (in weight %) | 0 A | 0.025 A | 0.05 A | 0.1 A |
|---|---|---|---|---|
| 0 B5 | | 56 | 39 | 17 |
| 0.0625 B5 | 43 | 38 | 26 | 15 |
| 0.125 B5 | 23 | 20 (FIC 0.75) | 16 (FIC 1) | 9 |
| 0.25 B5 | 17 | 14 | 12 | 6 |

| % MIC of A alone | % MIC of B5 alone | MIC of each compound as a mixture A % | MIC of each compound as a mixture B5 % | FIC Index | Ratio A/B5 |
|---|---|---|---|---|---|
| 0.1 | 0.25 | 0.025 | 0.125 | 0.75 | 0.2 |

The results obtained show synergistic inhibitory activity for the mixtures:
i) 0.025% of A and 0.125% of B5, i.e. A/B5 ratio=0.2
ii) 0.05% of A and 0.125% of B5, i.e. A/B5 ratio=0.4

The invention claimed is:

1. An antimicrobial mixture comprising 4-(3-ethoxy-4-hydroxyphenyl)butan-2-one and an additional compound chosen from:
   i) a monovalent or divalent metal salt of pyrithione;
   ii) piroctone olamine;
   iii) diazolidinylurea;
   iv) a hexamidine compound chosen from hexamidine diisethionate, hexamidine diparaben and hexamidine paraben;
   v) imidazolidinylurea;
   wherein when the additional compound is a monovalent or divalent metal salt of pyrithione, the antimicrobial mixture comprises 4-(3-ethoxy-4-hydroxyphenyl)butan-2-one and the monovalent or divalent metal salt of pyrithione in amounts such that the 4-(3-ethoxy-4-hydroxyphenyl)butan-2-one/pyrithione salt weight ratio ranges from 400 to 4500;
   when the additional compound is piroctone olamine, the antimicrobial mixture comprises 4-(3-ethoxy-4-hydroxyphenyl)butan-2-one and piroctone olamine in amounts such that the 4-(3-ethoxy-4-hydroxyphenyl)butan-2-one/piroctone olamine weight ratio ranges from 10 to 60;
   when the additional compound is diazolidinylurea, the antimicrobial mixture comprises 4-(3-ethoxy-4-hydroxyphenyl)butan-2-one and diazolidinylurea in amounts such that the 4-(3-ethoxy-4-hydroxyphenyl)butan-2-one/diazolidinylurea weight ratio ranges from 0.5 to 2.5;
   when the additional compound is the hexamidine compound, the antimicrobial mixture comprises 4-(3-ethoxy-4-hydroxyphenyl)butan-2-one and the hexamidine compound in amounts such that the 4-(3-ethoxy-4-hydroxyphenyl)butan-2-one/hexamidine compound weight ratio ranges from 5 to 85;
   when the additional compound is imidazolidinylurea, the antimicrobial mixture comprises 4-(3-ethoxy-4-hydroxyphenyl)butan-2-one and imidiazolidinylurea in amounts such that the 4-(3-ethoxy-4-hydroxyphenyl)butan-2-one/imidiazolidinylurea weight ratio ranges from 0.1 to 0.8;
   and wherein the amounts and ratios of the 4-(3-ethoxy-4-hydroxyphenyl)butan-2-one and the additional compound are selected to produce synergistic antimicrobial activity.

2. The antimicrobial mixture as claimed in claim 1, wherein the additional compound is a monovalent or divalent metal salt of pyrithione.

3. The antimicrobial mixture as claimed in claim 2, wherein the monovalent or divalent metal salt of pyrithione is chosen from the sodium, calcium, magnesium, barium, strontium, zinc, cadmium, tin and zirconium salts.

4. The antimicrobial mixture as claimed in claim 2, wherein the monovalent or divalent metal salt of pyrithione is the zinc salt or the sodium salt.

5. The antimicrobial mixture as claimed in claim 2, wherein the monovalent or divalent metal salt of pyrithione is the zinc salt.

6. The antimicrobial mixture as claimed in claim 2, which has a 4-(3-ethoxy-4-hydroxyphenyl) butan-2-one/pyrithione salt weight ratio ranging from 500 to 2200.

7. The antimicrobial mixture as claimed in claim 2, which has a 4-(3-ethoxy-4-hydroxyphenyl) butan-2-one/pyrithione salt weight ratio ranging from 800 to 4500.

8. The antimicrobial mixture as claimed in claim 1, wherein the additional compound is piroctone olamine.

9. The antimicrobial mixture as claimed in claim 8, which comprises 4-(3-ethoxy-4-hydroxyphenyl) butan-2-one and piroctone olamine in amounts such that the 4-(3-ethoxy-4-hydroxyphenyl) butan-2-one/piroctone olamine weight ratio ranges from 15 to 50.

10. The antimicrobial mixture as claimed in claim 1, wherein the additional compound is diazolidinylurea.

11. The antimicrobial mixture as claimed in claim 10, which comprises 4-(3-ethoxy-4-hydroxyphenyl) butan-2-one and diazolidinylurea in amounts such that the 4-(3-ethoxy-4-hydroxyphenyl) butan-2-one/diazolidinylurea weight ratio ranges from 0.6 to 2.3.

12. The antimicrobial mixture as claimed in claim 1, wherein the additional compound is a hexamidine compound chosen from hexamidine diisethionate, hexamidine diparaben or hexamidine paraben.

13. The antimicrobial mixture as claimed in claim 12, wherein the hexamidine compound is hexamidine diisethionate.

14. The antimicrobial mixture as claimed in claim 12, which comprises 4-(3-ethoxy-4-hydroxyphenyl) butan-2-one and the hexamidine compound in amounts such that the 4-(3-ethoxy-4-hydroxyphenyl) butan-2-one/hexamidine compound weight ratio ranges from 7 to 82.

15. The antimicrobial mixture as claimed in claim 1, wherein the additional compound is imidiazolidinylurea.

16. The antimicrobial mixture as claimed in claim 15, which comprises 4-(3-ethoxy-4-hydroxyphenyl) butan-2-one and imidiazolidinylurea in amounts such that the 4-(3-ethoxy-4-hydroxyphenyl) butan-2-one/imidiazolidinylurea weight ratio ranges from 0.15 to 0.45.

17. The antimicrobial mixture as claimed in claim 15, which has a 4-(3-ethoxy-4-hydroxyphenyl) butan-2-one/imidiazolidinylurea weight ratio ranging from 0.2 to 0.8, and more preferentially ranging from 0.4 to 0.6.

18. The antimicrobial mixture as claimed in claim 15, which has a 4-(3-ethoxy-4-hydroxyphenyl) butan-2-one/imidiazolidinylurea weight ratio ranging from 0.1 to 0.6.

19. A composition comprising, in a physiologically acceptable medium, an antimicrobial mixture as claimed in claim 1.

20. The composition as claimed in claim 19, which comprises at least one additional ingredient chosen from water, oils, polyols containing from 2 to 10 carbon atoms, gelling agents, surfactants, film-forming polymers, colorants, fragrances, fillers, UV-screening agents, plant extracts, cosmetic and dermatological active agents, and salts.

21. The composition as claimed in claim 19, wherein the 4-(3-ethoxy-4-hydroxyphenyl) butan-2-one is present in a content ranging from 0.01% to 5% by weight relative to the total weight of the composition.

22. A nontherapeutic cosmetic treatment process for caring for and/or making up and/or cleansing keratin materials, comprising the application to said keratin materials of a composition as claimed in claim 19.

23. A process for preserving a composition comprising a physiologically acceptable medium, wherein the composition is a cosmetic or dermatological composition, which comprises incorporating into said composition an antimicrobial mixture as defined in claim 1.

24. A process for preserving a composition comprising a physiologically acceptable medium which comprises including an antimicrobial mixture as defined in claim 1 in said composition, for preserving a composition comprising a physiologically acceptable medium.

25. The antimicrobial mixture as claimed in claim 2, which exhibits synergistic antimicrobial activity against gram positive bacteria.

26. The antimicrobial mixture as claimed in claim 25, wherein the gram positive bacteria is *Staphylococcus aureus*.

27. The antimicrobial mixture as claimed in claim 2, which exhibits synergistic antimicrobial activity against *Candida albicans*.

\* \* \* \* \*